United States Patent [19]

Corey

[11] 4,323,114

[45] Apr. 6, 1982

[54] CLUSTER HEAT EXCHANGER

[75] Inventor: Gerald D. Corey, Hermosa Beach, Calif.

[73] Assignee: Fansteel Inc., North Chicago, Ill.

[21] Appl. No.: 23,734

[22] Filed: Mar. 26, 1979

[51] Int. Cl.³ .............................. F28F 9/26; F28F 7/00
[52] U.S. Cl. ........................................ 165/78; 165/143; 122/32
[58] Field of Search ............................. 122/32, 33, 34; 165/144, 143, 158, 163, 145, 78

[56] References Cited

U.S. PATENT DOCUMENTS

| | | | |
|---|---|---|---|
| 2,220,045 | 10/1940 | Kraft et al. | 122/32 |
| 3,266,566 | 8/1966 | Huet | 165/145 |
| 3,442,760 | 5/1969 | Rigg | 122/32 X |
| 3,817,708 | 6/1974 | Vernon | 165/158 X |
| 3,841,271 | 10/1974 | Harris et al. | 122/32 |
| 3,863,711 | 2/1975 | Beckmann et al. | 165/163 |
| 4,103,647 | 8/1978 | Westebbe | 122/34 X |

Primary Examiner—Samuel Scott
Assistant Examiner—Theophil W. Streule, Jr.
Attorney, Agent, or Firm—Barnes, Kisselle, Raisch & Choate

[57] ABSTRACT

A heat exchange assembly which utilizes a central source of a heated fluid, such as steam, and serves as a hot fluid distribution center for a plurality of satellite chambers removably disposed on a supporting rack around the source. Each satellite chamber, arranged in series with the others, receives the hot fluid at one end from the central source and discharges condensate at the other end. Longitudinal pipes in the satellite chamber of the cluster carry the fluid to be processed through the chambers. The series piping permits flow to be reversed in the satellite chambers to even out the deterioration of each chamber.

1 Claim, 6 Drawing Figures

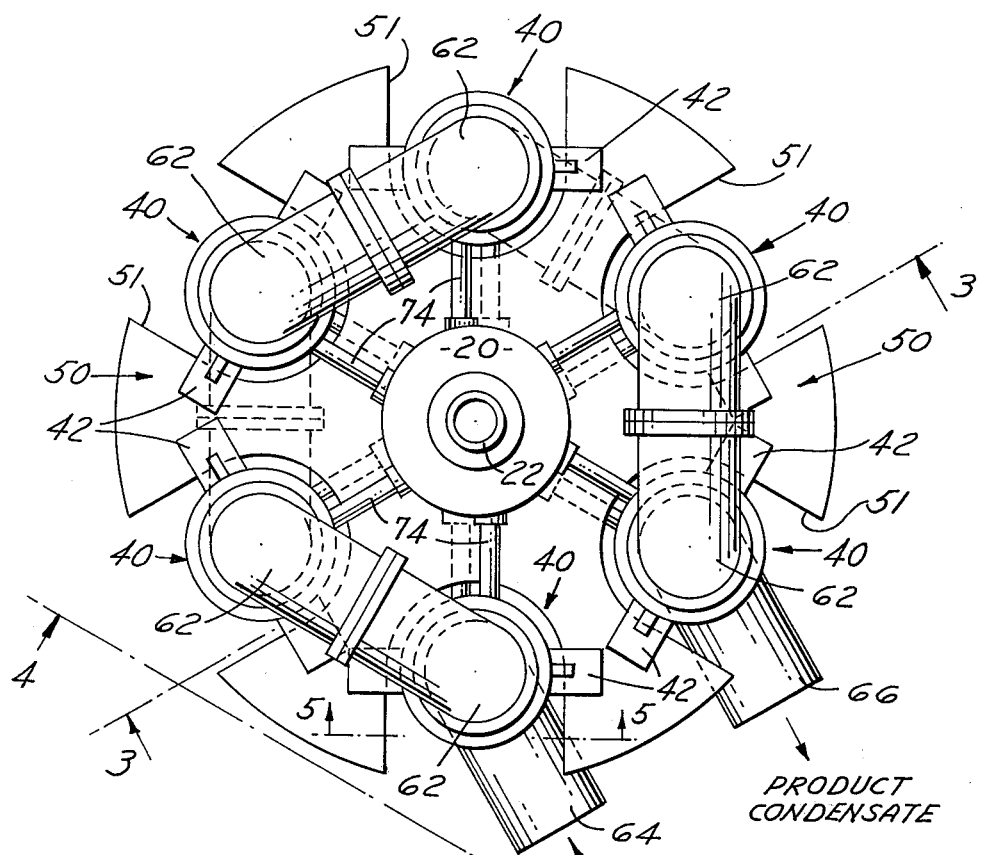
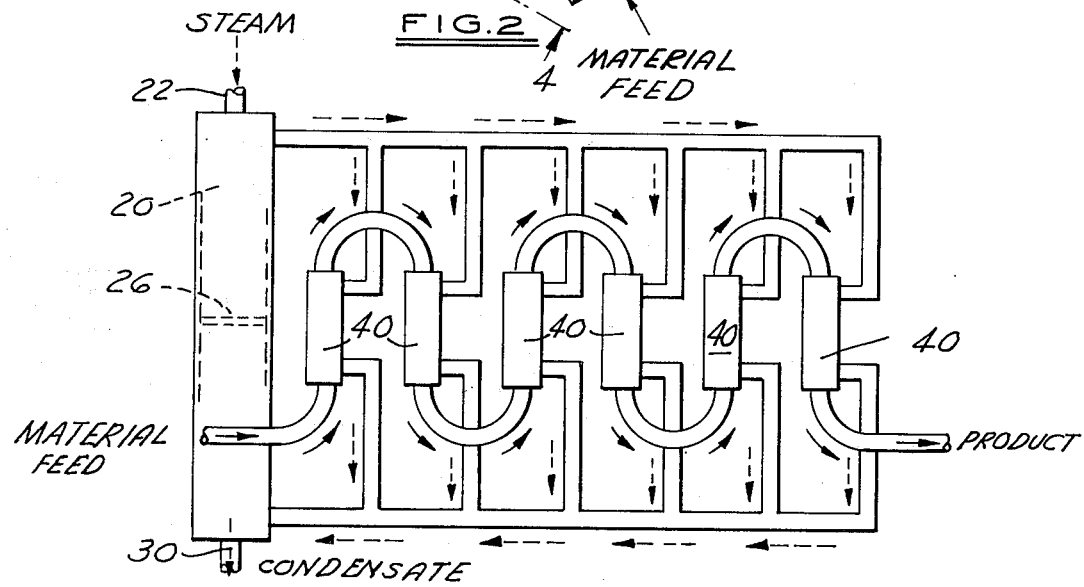

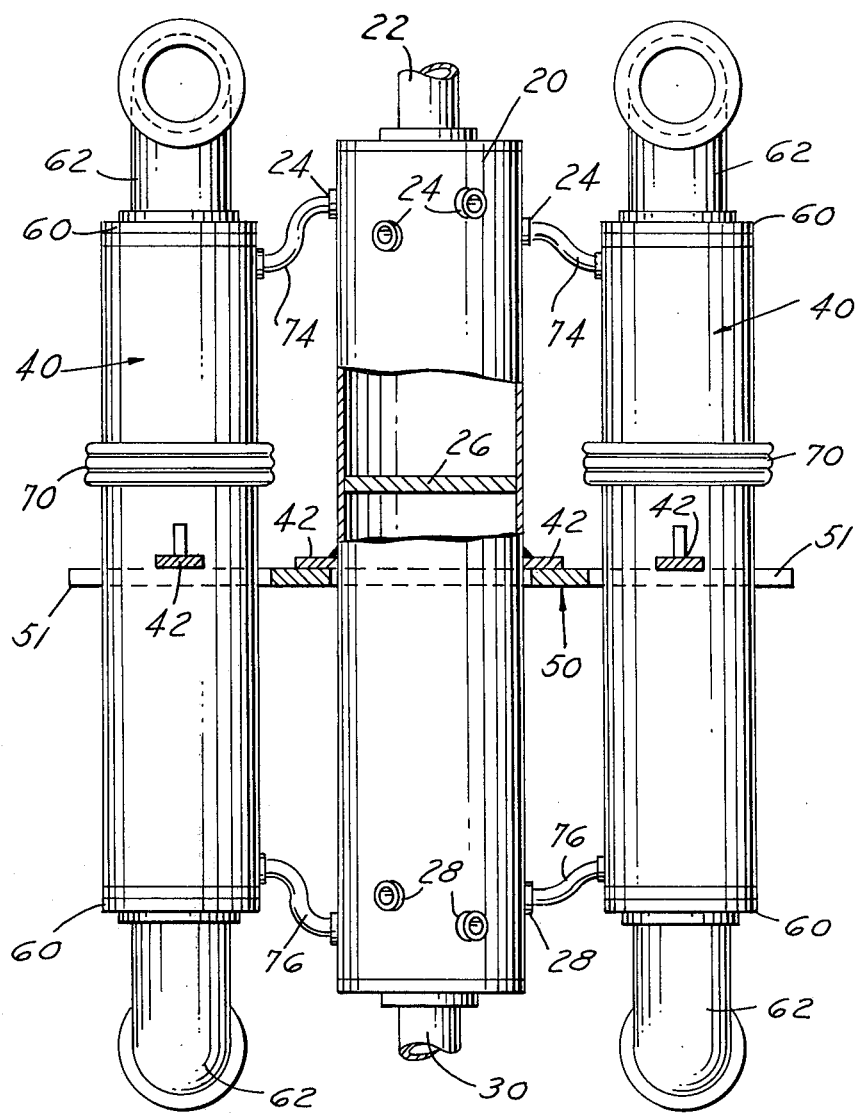

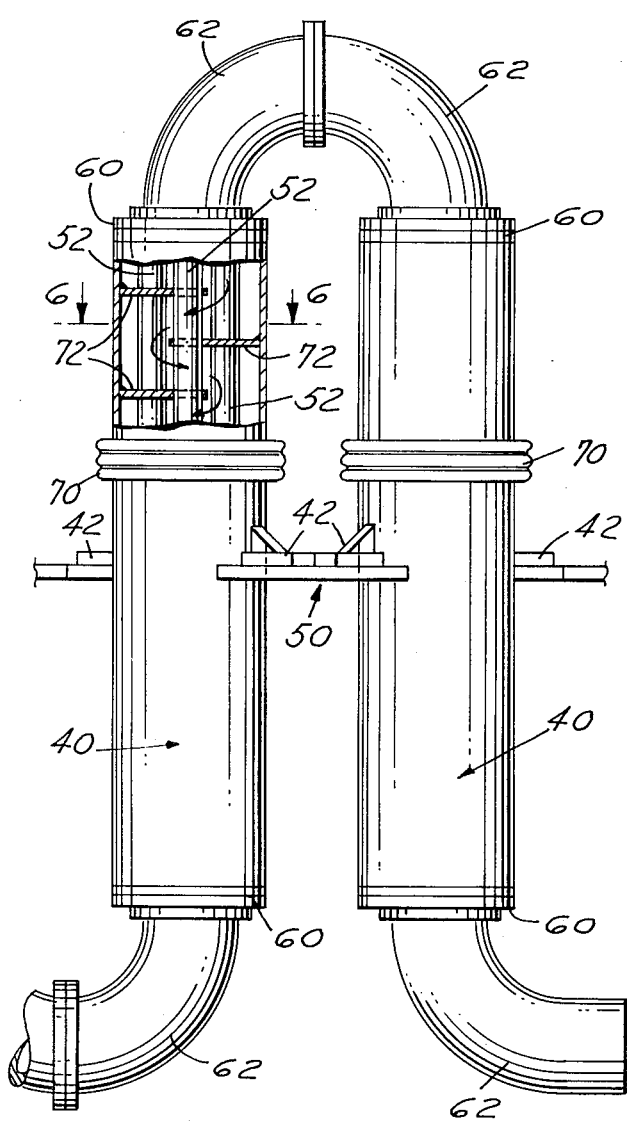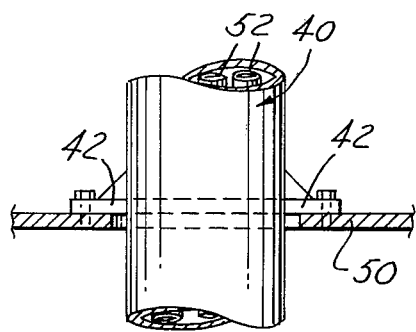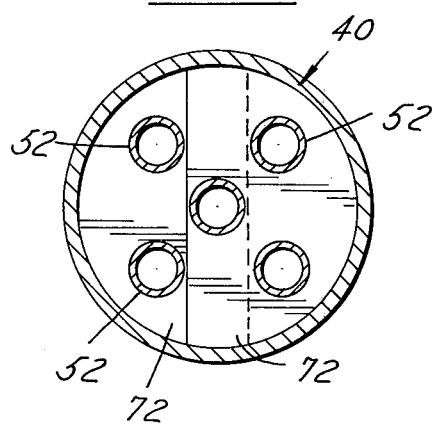

CLUSTER HEAT EXCHANGER

FIELD OF INVENTION

In the field of heat exchangers, hot fluid, such as steam, is arranged in an apparatus to transfer its heat to a second fluid which is passed through a zone heated by the first fluid. The invention herein described relates to apparatus for effecting this heat transfer.

BACKGROUND OF THE INVENTION

In the heat exchanger field, it has been common to utilize the steam boiler approach wherein a single large chamber is fitted with a plurality of pipes which extend through the chamber to receive heat from a hot fluid within the larger chamber. When corrosive materials are being treated, the life of the pipes is such that breakdowns occur and pipes must be replaced. This requires a shutdown of the entire unit until repairs can be made.

The present invention is directed to a heat exchange system wherein individual modules can be inserted and replaced in a system with only a momentary shutdown to switch feed pipes. The invention contemplates repair or replacement of modules while the remainder of the system continues to operate when such modules, or two or more complete heat exchange systems, are used in parallel. A structural arrangement of modules clustered around a central heating source is designed for easy removal and replacement of the modules which are connected in series. The system also makes it readily possible to invert various modules or at least reverse the flow so that the areas carrying the hottest fluids can become areas carrying the cooler fluids.

The contemplated design renders the handling of the heated fluid source more efficient since only a single and separate steam and condensate manifold is required. Thus, with the central steam unit and the clustered heat exchangers, a system having a much longer life is possible together with the advantages of a minimum of downtime.

Other objects and features of the invention will be evident in the following detailed description directed to metal workers skilled in the art of handling hot and corrosive fluids in order to enable them to practice the invention, all in connection with the best mode presently contemplated for the practice of the invention.

BRIEF DESCRIPTION OF THE DRAWINGS

Drawings accompany the disclosure, and the various views thereof may be briefly described as:

FIG. 1, a top assembly view of the heat exchanger constructed in accordance with the present invention.

FIG. 2, a schematic flow diagram showing the flow pattern in the heat exchanger.

FIG. 3, a section of the assembly on line 3—3 of FIG. 1.

FIG. 4, a side view of the assembly on line 4—4 of FIG. 1.

FIG. 5, a section on line 5—5 of FIG. 1.

FIG. 6, a section on line 6—6 of FIG. 4.

DETAILED DESCRIPTION OF THE DISCLOSED EMBODIMENT

With reference to the drawings, the invention is illustrated in connection with a heat exchanger for use in processing of triple superphosphate and particularly the concentrating of phosphoric acid for fertilizer end usage. Steam is used as the heating fluid. In this description, the heat source fluid is characterized as the "heating" fluid and the material being heated is characterized as the "heated" fluid.

In FIGS. 1 and 3, a central cylindrical heating fluid chamber 20 positioned in a vertically upright position is suitably supported in an appropriate industrial setting. This chamber 20 has a steam inlet 22 at the top surrounded by steam outlet ports 24. The chamber is divided into upper and lower chambers by a septum 26. The upper chamber is a steam receiving and distributing chamber while the lower chamber serves as a condensate receptacle with inlet ports 28 and an outlet conduit 30.

Situated in a cluster around the tank 20 are six elongate treating chambers 40. Each of these treating chambers are provided with reinforced, diametrically opposed, support tabs 42 extending radially from the chambers at about midway between the ends.

A support ring flange platform 50 carried by the central chamber has radially open recesses 51 which receive the respective treating chambers. The tabs 42 rest on the platform at the sides of the recesses and may be bolted to the ring flange platform as shown in FIG. 5. As shown best in FIGS. 4 and 6, each treating chamber 40 has five conduits 52 extending lengthwise for the length of the chamber and manifolded at each end by manifold plates 60. Each manifold plate 60 has a passage tube connected centrally to serve as an inlet or outlet as the particular position may dictate.

As shown in FIGS. 1, 3 and 4, each treating chamber is connected to an adjacent chamber by double 90° elbows 62, certain connectors providing an inlet 64 for feed material and an outlet 66 for the treated product. Each treating chamber has an expansion joint 70 just above the central support sections.

As shown also in FIG. 4, each treating chamber 40 has staggered transverse arcuate baffles 72 which extend a little beyond center to overlap each other at the chordal lines. These baffles also stabilize the conduits 52.

The outlet ports 24 on the central steam chamber 20 are connected by suitable conduits 74 to inlet ports at the top of each cluster cylinder 40. Outlet ports at the bottom of the chambers 40 are connected by suitable conduits 76 to the inlet ports 28 at the bottom of the central cylinder 20.

A diagrammatic flow diagram is shown in FIG. 2 where the steam flow is illustrated by dotted arrows and the treated fluid by solid arrows.

In the described structure, steam enters the inlet 22 and passes through conduits 74 to the top of the cluster chambers 40 where it passes downwardly in a tortuous path due to the baffles 72, meanwhile transferring heat to the tubes 52. At the bottom of each chamber 40 residual steam and condensate will exhaust to the conduits 76 and the condensate chamber at the bottom of the central cylinder and flow to the outlet 30.

The treated fluid will enter the cluster tanks at 64 and flow downwardly and upwardly in a series flow through the tanks 40 to the outlet 66.

Since the tanks are most apt to deteriorate most rapidly at the area of entry of the hottest treating fluid, that is, at the top as shown in the drawings, it is possible to even out the service life of a particular tank or all of the tanks by reversing the flow. This can readily be accomplished by inverting the tanks or reversing the flow to place the hottest reaction area at an area which has previously been the coolest.

In the event a particular tank needs individual repair, it can be disconnected and by-passed by manipulation of the interconnecting conduits or easily replaced by a tank in new or rebuilt condition. The support platform arrangement makes it possible to disconnect and lift out a tank without disturbing the mount of the remaining tanks.

The example shown has cluster tanks about 10' high and a central steam chamber about 17' long and 8" in diameter. The satellite or cluster chambers are about 4" in diameter and positioned on 12" centers.

I claim:

1. A heat exchanger apparatus for transferring heat from one fluid to another which comprises:
   (a) a supported elongate first vertical central chamber divided laterally into a top inlet chamber for a heated treating fluid and a bottom condensate chamber for condensed treating fluid,
   (b) a circular support rack positioned around said first vertical chamber having a plurality of radially extending segments forming a plurality of circumferentially spaced support recesses open to the periphery of said rack,
   (c) a plurality of secondary symmetrical, invertible vertical elongate chambers having mounting extensions substantially centrally located intermediate the ends thereof to cooperate with said segments of said rack to removably support said secondary chambers in upright and invertible position as a circular cluster in said circumferentially spaced support recesses, said secondary chambers each having one or more first longitudinal passages for a treated fluid surrounded by a second essentially longitudinal, baffled passage for a treating fluid,
   (d) said secondary chambers having identical and symmetrical flow connections at each end to said first and second passages respectively,
   (e) means connecting the flow connections of said second passages at the tops and bottoms respectively of said invertible secondary chambers in parallel with the top and bottom chambers of said first vertical chamber to permit flow of treating fluid from said inlet chamber of said first vertical chamber through each of said second passages of said secondary chambers and back to said condensate chambers, and
   (f) means connecting the flow connections of said first passages in said secondary chambers alternately at the top and bottom of adjacent secondary chambers to permit series flow of treated material through said secondary chambers, wherein the flow of treating and treated material is essentially circular around said circular support and said first vertical chamber.

* * * * *